US 8,403,381 B2

(12) United States Patent
Brandt

(10) Patent No.: US 8,403,381 B2
(45) Date of Patent: Mar. 26, 2013

(54) HORSE STALL DOOR LATCH

(75) Inventor: Richard E. Brandt, Newmanstown, PA (US)

(73) Assignee: Richard E. Brandt, Newmanstown, PA (US)

( * ) Notice: Subject to any disclaimer, the term of this patent is extended or adjusted under 35 U.S.C. 154(b) by 356 days.

(21) Appl. No.: 12/650,115

(22) Filed: Dec. 30, 2009

(65) Prior Publication Data

US 2010/0164237 A1   Jul. 1, 2010

Related U.S. Application Data

(60) Provisional application No. 61/204,078, filed on Dec. 30, 2008.

(51) Int. Cl.
*E05C 3/12* (2006.01)
*E05C 3/00* (2006.01)

(52) U.S. Cl. ........ 292/219; 292/200; 292/226; 292/228; 292/DIG. 46

(58) Field of Classification Search .................. 292/200, 292/219, 226, 228, DIG. 46
See application file for complete search history.

(56) References Cited

U.S. PATENT DOCUMENTS

| 906,452 | A | * | 12/1908 | McCleer | 292/128 |
|---|---|---|---|---|---|
| 1,314,978 | A | * | 9/1919 | Nelson | 292/128 |
| 1,639,878 | A | * | 8/1927 | Bentrott | 292/128 |
| 3,044,287 | A | * | 7/1962 | Pelcin | 70/99 |
| 3,050,322 | A | * | 8/1962 | Miller | 292/114 |
| 3,161,923 | A | * | 12/1964 | Crain | 292/128 |
| 4,073,517 | A | | 2/1978 | Bills | |
| 4,248,461 | A | * | 2/1981 | Stevens | 292/218 |
| 4,821,680 | A | | 4/1989 | Smith et al. | |
| 4,877,275 | A | | 10/1989 | DeForrest, Sr. | |
| 5,018,373 | A | | 5/1991 | Weinerman et al. | |
| 5,042,854 | A | | 8/1991 | Huang | |
| 6,886,305 | B2 | * | 5/2005 | Ward | 52/745.15 |
| 6,904,869 | B1 | | 6/2005 | Geisthardt | |
| 7,066,502 | B1 | | 6/2006 | Makus | |
| 7,503,599 | B2 | * | 3/2009 | Ward | 292/341.16 |
| 7,520,544 | B2 | * | 4/2009 | Cutrer | 292/341.14 |
| 8,096,593 | B2 | * | 1/2012 | Gibbons | 292/262 |
| 2007/0182168 | A1 | * | 8/2007 | Allen | 292/340 |
| 2008/0150300 | A1 | | 6/2008 | Harger et al. | |

* cited by examiner

*Primary Examiner* — Carlos Lugo
(74) *Attorney, Agent, or Firm* — Fox Rothschild LLP

(57) ABSTRACT

The present invention relates to a latch mechanism for securing a movable panel member such as a door to a stationary panel member such as a wall. The latch mechanism has a receiver member attached to one of the panels and a latch member attached to the other pane and which engages the receiver member to secure the two panels together.

16 Claims, 6 Drawing Sheets

HORSE STALL DOOR LATCH

CROSS-REFERENCE TO RELATED APPLICATIONS

This application claims priority to U.S. Provisional Patent Application Ser. No. 61/204,078 filed Dec. 30, 2008, the disclosure of which is incorporated by reference herein.

FIELD OF THE INVENTION

The present invention relates to a latch mechanism suitable for a range of applications, particularly securing a first panel member to a second panel member of an enclosure wherein one of the panel members is slidably disposed relative to the other panel member.

BACKGROUND OF THE INVENTION

Sliding doors are known in the art and can be found in a wide variety of settings including residential, commercial and industrial. For example, many barns and horse stalls use sliding doors which have advantages over swing style doors for the particular use.

Typical sliding doors have a stationary track mounted on the wall at the top of the door opening. The track extends over the door opening as well as over the area where the door is positioned when in the open position. The door is suspended from and attached to wheels, or trolleys having wheels, that move on the track between open and closed positions. To be slidable relative to the wall, it is appreciated that the door moves in a plane adjacent to the wall, e.g., in front of or behind the wall.

For many uses, it is desirable to be able to secure or lock the door in its closed position. While a variety of such mechanisms are known, many are insufficient to adequately secure the door in a closed position. This is particularly true in instances where maintaining the door in the closed position is of primary importance. Sliding barn or stall doors, for example, are often used to corral livestock or other animals within a barn or stall. Many of the latch mechanisms presently used, however, are easily manipulated by the animals to unlock the door, thus allowing the animal(s) to escape. Other type mechanisms are flimsy and unreliable.

Accordingly, there remains a need for a simple and relatively inexpensive slide door lock that provides an operating mechanism for securing the sliding door in a closed position, while preventing the door from being inadvertently opened by an external source. In particular, although not considering limiting to the instant invention, there is a need in the art for a latch mechanism to secure a barn or stall door in a closed position so as to prevent the door or latch from being opened by the animals contained therein. The instant invention addresses the foregoing needs.

SUMMARY OF THE INVENTION

The present invention relates to a simple and reliable latch mechanism suitable for a range of applications. In one embodiment, the present invention provides a latch mechanism for securing a pair of panel members where one of the panel members is movable relative to the other. To this end, the panel members are relatively moveable between a first position wherein the panels are secured together and close an opening in a structure and a second position wherein the panels are separated and open the structure. The latch mechanism includes a latch member having a latch tooth projecting from a face of the latch member that, in certain embodiments, has an inclined front surface portion and a vertically oriented rear portion.

The latch member is pivotally coupled to a first of the panel members by a mounting mechanism such that the latch tooth projects from the first end of the latch member at or near the leading edge of the panel member. The mounting member may include a supporting member and at least two wall plates extending perpendicularly thereto that are either integrally formed or otherwise secured to the mounting member using one or more of the methods provided herein. The mounting member may be pivotally coupled to the latch member by way of a rotatable pin element passing through two aligned openings in the side walls of the mounting member as well as a housing extension of the latch member. The supporting member further secures the mounting member to the first of the panel members, in one embodiment, by way of one or more bolts.

A receiver element is coupled to a second of the panel members. The receiver includes a slot that is positioned on the receiver to receive the latch tooth of the latch member and to secure the first and second panels when in the first position. In one embodiment, the receiver is secured to the second of the panel members by way of one or more bolts.

The instant latching mechanism further includes a first biasing member that is positioned and configured to provide a biasing force on the latching member and control the interfitting relationship of the latching tooth with the slot in the receiver. In one embodiment, the biasing force urges the latch tooth into the slot when the panel members are brought into the first position. When the latch member is operated against the biasing force, the latch tooth is retracted from the slot to allow movement of the panel members to the second position.

The latch mechanism may also include an optional second biasing member extending from a housing on the mounting member that may be in a direction parallel to and substantially underneath the latch member. When the first and second panel members are secured in the first position, the second biasing member contacts both the mounting member and the opposing panel member thus providing opposing forces on both panels. Accordingly, when the latch tooth is retracted from the slot the second biasing member urges the first and second panel members away from each other into the second position, i.e. facilitates urging the panel members apart.

In further embodiments, the latch mechanism may also include a guide bar and guide plate to facilitate guiding the latch projection into alignment with the slot. The guide bar extends from the mounting member and is positioned to substantially surround the first end of the latch member. The guide plate is coupled to a leading edge of the first of the panel members. These two elements facilitate guiding the latch tooth into the slot wherein the latching member will reliably interlock with the receiver.

To further facilitate alignment of the latch member with the receiver, the latch mechanism may also optionally include a spacer element. In one embodiment, the spacer element is provided between the guide plate and the first of the panel members. In an alternative embodiment, the spacer element is provided between the mounting member and the first of the panel members to facilitate guiding the latch projection into alignment with the slot.

In even further embodiments, the latch mechanism may also include a handle that is mounted to one panel member. In certain embodiments, the handle is mounted in juxtaposition to the receiver on the second panel member and can be used by an operator to assist in opening and closing the door or otherwise moving the panels from the first to the second position.

As provided herein, in one embodiment, the first of the panel members is stationary (e.g. a door frame) and the second of the panel members is movable (e.g. a sliding door). Alternatively, the first of the panel members is movable and the second of the panel members is stationary.

While not limited thereto, in certain embodiments, each of the latch member, mounting member and receiver are made with 3/16" powder coated steel.

DETAILED DESCRIPTION OF THE INVENTION

The present invention relates to a simple and reliable latch mechanism suitable for opening and closing a structure. Broadly speaking, the latch mechanism is applicable for securing two panels where one of the panel members is moveable between a first position in which the members are adjacent to one another and the structure is closed, and a second position in which the members are separated and the structure is open. The structure may be, for example, a barn or stall where the stationary panel is a section of wall or other stationary structure and the moveable panel is a sliding door. The latching mechanism is used in such a case to secure the door in a closed position and, when desired, prevent an animal enclosed within the barn or stall from manipulating the latch to open the door and escape. The instant invention, however, is not limited to such an application and may be adapted for use with any similar doorway, window or otherwise known opening in any similar structure. To this end, the panel members discussed herein refer to any embodiment wherein one member is stationary and the other is moveable and wherein the panel members may be of any shape, size, curvature or the like.

With reference to FIGS. 1 to 6, a preferred embodiment of the present invention is now described. This illustrated embodiment is a latch mechanism 8 for securingly closing a sliding door 15 of a horse stall opening.

Figure 1:
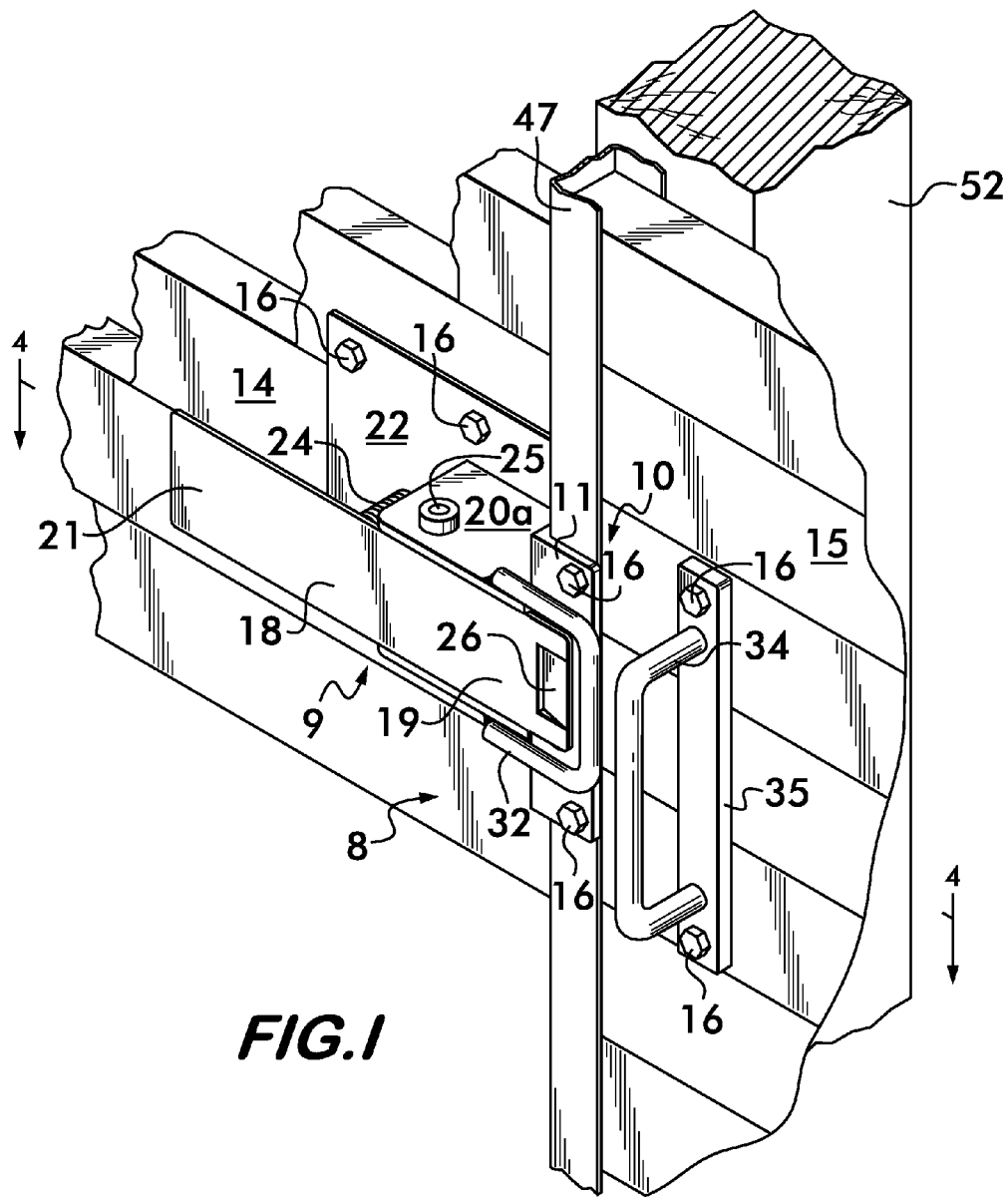
FIG. 1 is a perspective view of one embodiment of the present invention showing a sliding door in a closed position and the latching mechanism latching the door to the adjacent wall.
Figure 2:
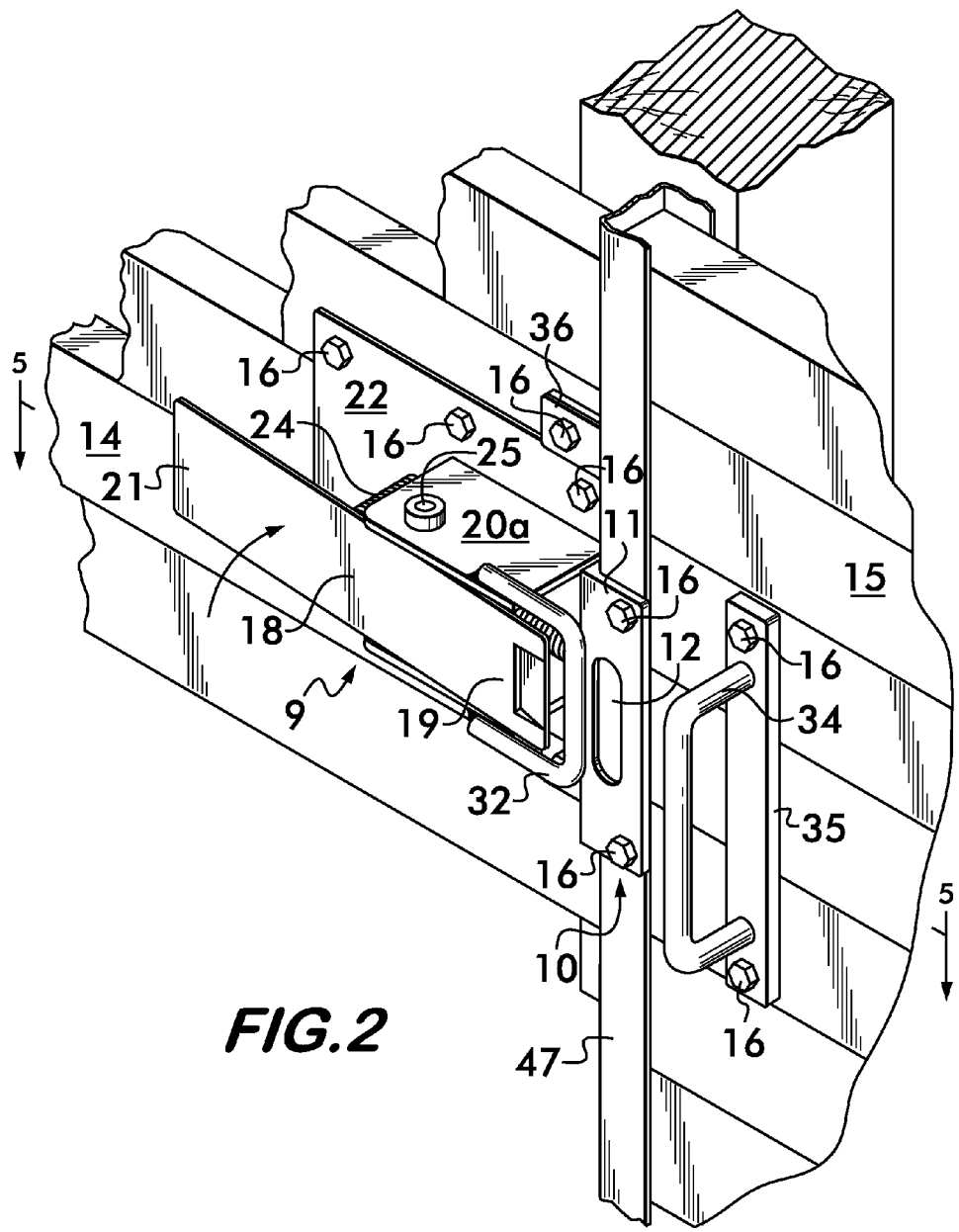
FIG. 2 is a perspective view of the latching mechanism of FIG. 1 shown in an un-latched position and the door slightly opened.
Figure 5:
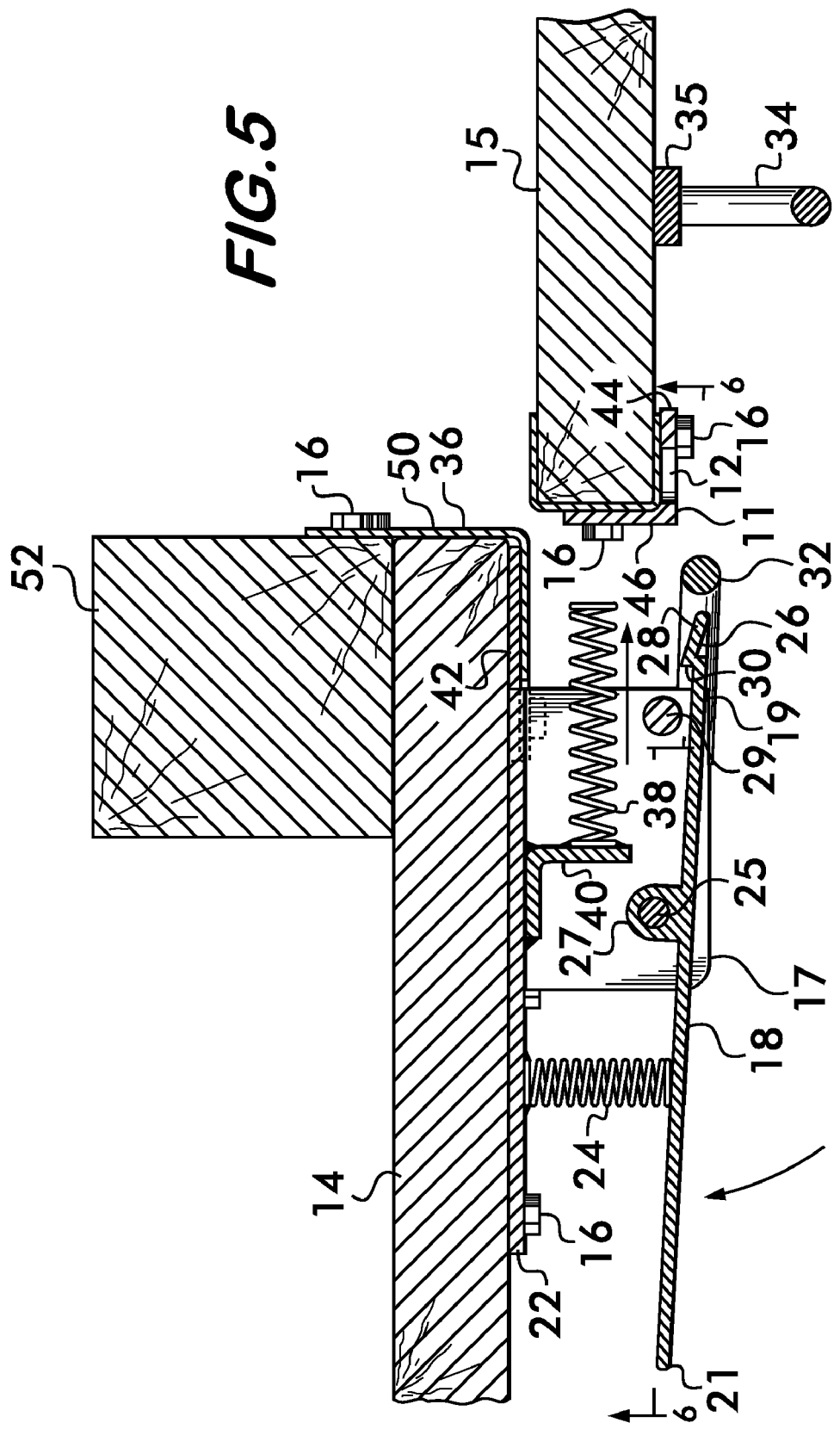
FIG. 5 is a cross sectional view taken along line 5-5 of FIG. 2.

With particular reference to FIG. 1, it is seen that the latch mechanism 8 is used for securing two panel members 14 and 15 to one another, one of the panel members being slidable relative to the other. As illustrated, one panel or door 15 is slidable relative to the stationary panel or wall 14. Such an embodiment is representative of a typical stall or barn door 15 that is supported from a track positioned above the door 15 (not shown) as is known in the art. The door 15 is slidable between a closed position as illustrated in FIG. 1 (i.e., the two panels 14 and 15 are adjacent to one another), and an open position whereby the door 15 would have been moved to the right as oriented in FIG. 1 (not shown although FIGS. 2 and 5 show the door 15 partially opened). The stationary wall 14 is formed as a typical wall of wood slats as shown, mounted to and supported on one or more structural posts 52. The moveable door 15 is formed as a typical sliding door formed of wood slats with a metal edge 47, as shown. As provided in greater detail below, the latch mechanism 8 includes a first or latch section 9 mounted on the stationary panel (wall) 14, and a complementary second or receiver section 10 mounted on the sliding panel (door) 15. The latch mechanism 8 is now described in further detail.

With further reference to FIGS. 2, 3, 5 and 6, the receiver 10 is attached to the edge of the sliding door 15 and has a slot 12 configured for receiving a latch member as further described below. The latch receiver 10 is formed as an angled member having first and second sections 44 and 46 perpendicular to one another, the slot 12 being formed as an oval-shaped opening in section 44 as shown. One of ordinary skill in the art will appreciate that the slot is not necessarily limited to such a configuration and may be machined or formed into any shaped well, recess, or opening that may be used for the purposes provided herein.

The receiver 10 is secured to the leading metal edge 44 of the moveable panel member 15, e.g. the sliding door. The first section 44 of the receiver 10 may be positioned on an outward face of the door at or near the door's leading edge. As illustrated in FIG. 5, the second portion 46 of the receiver 10 is mounted on the leading edge of the door and provides a protective cover preventing damage during locking and unlocking. The receiver 10 may be mounted to the panel 15 using any means known in the art such as an adhesive, bolt, or the like. In the illustrated embodiment, the receiver is mounted using one or more lag bolts 16. The receiver 10 may be made of any suitable material such as, but not limited to, steel, or powder coated 3/16" steel as used in the present case.

Figure 3:
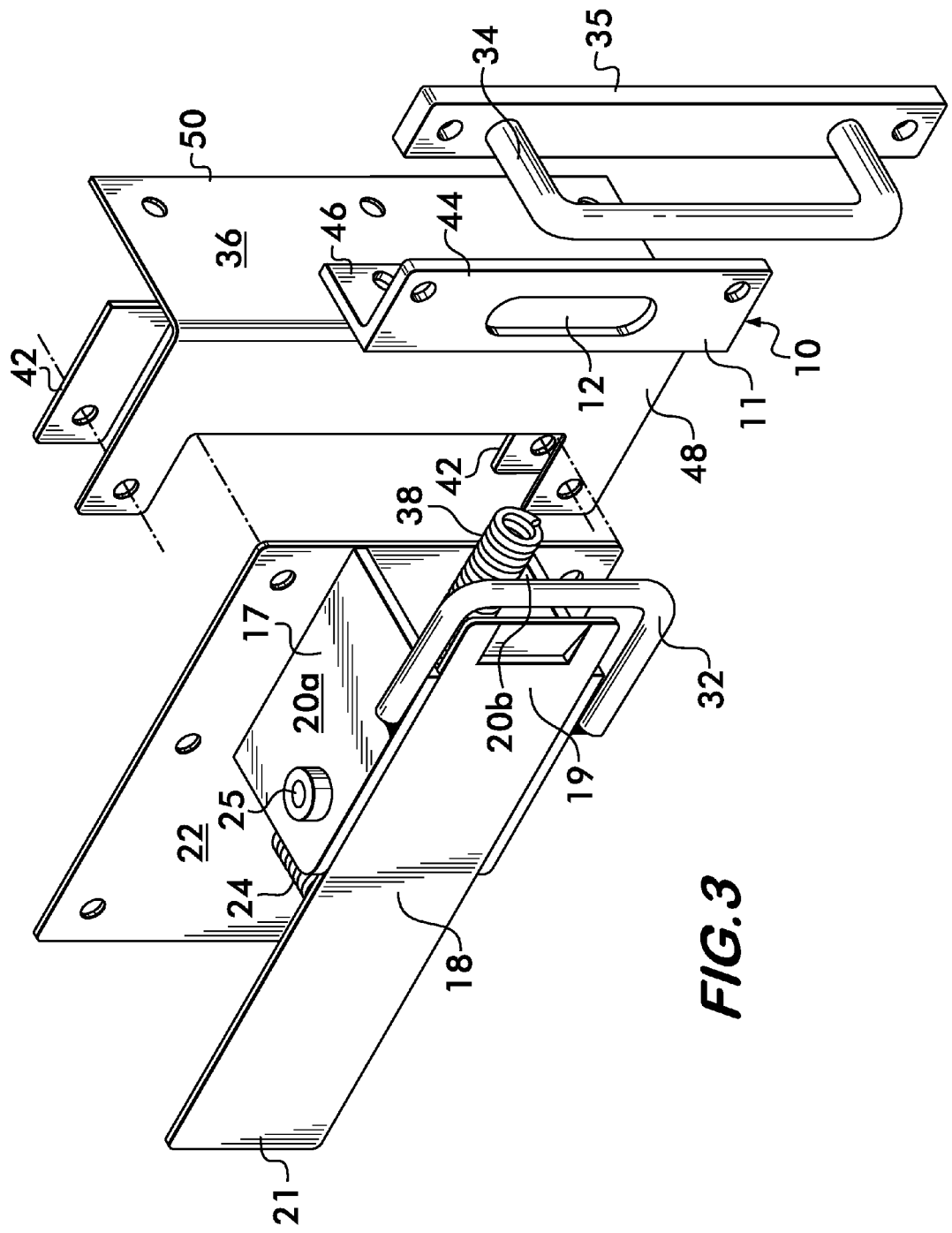
FIG. 3 illustrates an exploded view of the latching mechanism shown in FIG. 1.
Figure 4:
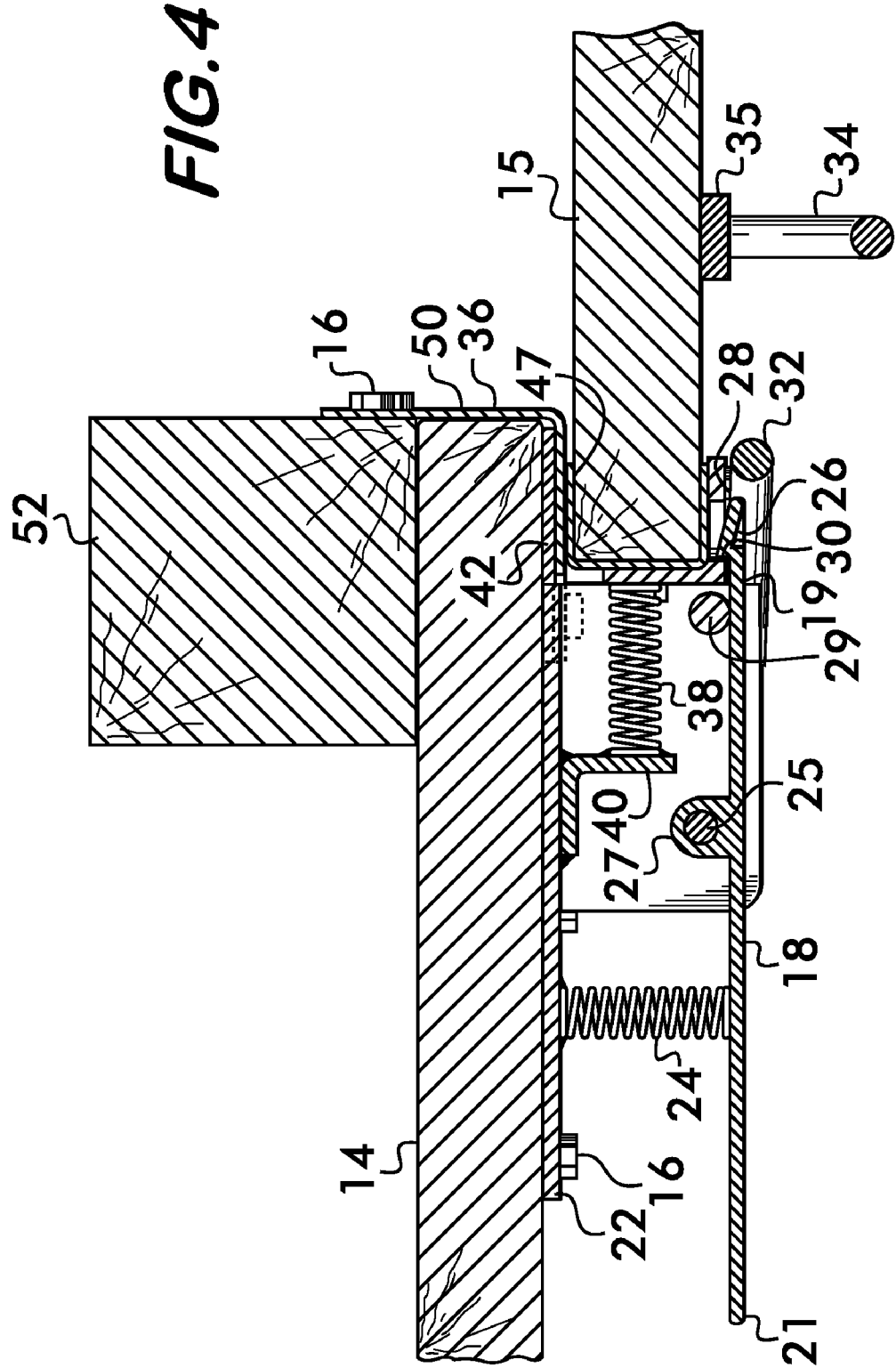
FIG. 4 is a cross sectional view taken along line 4-4 of FIG. 1.

The companion or complimentary aspect of the latch mechanism 8 is latch section 9 which includes latch member 18. Referring to FIG. 3, the latch member 18 is formed as a substantially rectangular plate member having a first side 19 and a second side 21, although the instant invention is not limited to such structure. As illustrated in FIGS. 4 and 5, extending from one face of the first side 19 is a latch projection or tooth 26. In one embodiment, the latch projection 26 has a gradually inclined front surface portion 28 and a shoulder portion 30 which is vertically oriented. In such a configuration, as the wall and door panel members 14, 15 are brought to a secured position, the inclined front surface portion 28 slidingly engages the receiver 10 and guides the latching member along the receiver until the latch projection 26 engages or fits within the slot 12. The shoulder portion 30 prevents separation of the panels 14, 15 as it abuts an edge of the slot 12 closest to the junction of the two panels as seen in FIG. 4. Such a configuration is not limiting to the invention, however, and any structure of a latch projection or tooth is contemplated, which may or may not be integral with the latch member, to achieve the same function. To this end, the latch tooth may be of any shape or configuration understood by one of ordinary skill in the art to interconnect with a corresponding structure in the receiver.

Extending from the same surface of the latching member 18 as the latching projection 26 is a hollow cylindrical pin housing or sleeve 27 shaped and adapted to receive a cylindrical pin element 25 and facilitate the pivotal mounting of the latching member 18 to a mounting member 17. In the illustrated embodiment, the pivot pin 25 is provided near or at the approximate center of the latch member 18. The housing 27 may be integrally formed with the latching mechanism 18, or by any suitable manner. The latch member 18 may be comprised of any suitable material including powder coated 3/16" steel.

Figure 6:
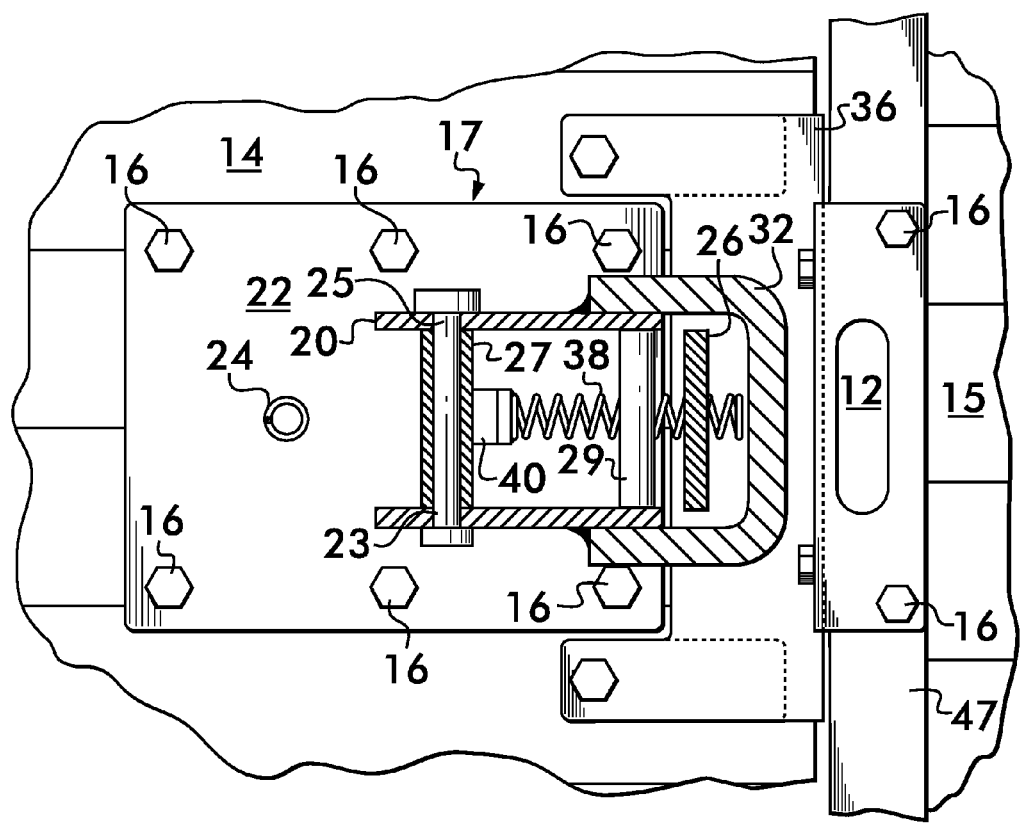
FIG. 6 is a cross sectional view taken along line 6-6 of FIG. 5.

The latch member 18 is pivotally mounted to the wall panel 14 by way of mounting member 17. Referring to FIG. 6, the mounting member 17 includes a mounting plate 22 having perpendicularly extending side wall plates 20a and 20b forming a hollow U-shaped channel structure as shown. Openings 23 in the side walls 20a, 20b are sized to receive the pin element 25, which pivotally secures the latch member 18 to the mounting member 17. More specifically, the pin element 25 aligns with both the openings 23 and secures the latching member 18 to the two side walls 20a and 20b. The pin element 25 is secured therewithin with an integral head at one end and a collet at the opposing end, as shown. Together, this assembly forms a pivot point or axis about which the latching member 18 can pivot. This axis or pivot point acts as a fulcrum for the latching member 18 and facilitates securing the latch projection 26 to the slot 12.

Also fixed between the side walls 20a and 20b is a stop element 29. Illustrated as a cylindrical bar, the stop element 29 contacts and stops further pivotal movement of the latching member 18 against the urging of a bias member 24. The stop element 29 is attached to the side walls 20a, 20b by any suitable means, such as welding. While not limited thereto, the mounting member 17 is made of a powder coated 3/16" steel or any other suitable material.

The mounting plate 22 of the latch section 9 may be secured to the wall panel 14 using any suitable method as known in the art, such as, but not limited to an adhesive, screws, etc. As illustrated in FIGS. 1, 2 and 6, the mounting plate 22 is secured to the wall panel 14 using 6 lag bolts 16. It may be preferable to have at least two of the bolts extend into the support post 52 or other structural support of the wall panel 14.

Latch section 9 further includes a first biasing member 24 to control the pivoting action of the latch member 18. Referring to FIGS. 4-6, the first biasing member 24 is formed as a coil spring secured at one end to the mounting plate 22 and at the other end to the underside of the latch member 18, the securing means being by any suitable method, e.g., welding, registration pins, etc. As seen, the first biasing member 24 is positioned perpendicularly to the latching member 18 at its second side 21 and opposite to the latch projection 26 relative to the pivot pin 25. The first biasing member 24 urges the second end 21 of the latching member 18 in a direction away from the metal support member 22, which in turn pivots the first end 19 of the latching member 18 about the pivot point towards the support member 22 against the stop element 29. This also secures the latching projection 26 in the slot 12 of the receiver 10 when the two are latched together when in the first position. As provided in FIGS. 2 and 5, by operating the second end 21 of the latching member against the biasing force of the biasing member 24, or in the instant case by depressing the latch member, the opposing first end 19 of the latching member 18 is raised and the projection 26 is removed from the slot 12, allowing the unlatching of the latch mechanism 8 and the movement of the door panel 15 from a closed (first) position into an open (second) position.

The latching mechanism 8 may also include a second biasing member 38 that urges the two panel members 14, 15 apart from each other. In the illustrated embodiment, the biasing member 38 takes the form of a coiled spring supported on and attached to an angle member 40 which in turn is attached to the mounting plate 22 as shown. Welding is one preferable attachment method. The second biasing member 38 is provided such that it extends in a direction parallel to and substantially underneath the latch member 18 to a point slightly beyond the first end 19 of the latching member. In such a configuration, the second biasing member 38 facilitates moving the panel members from the first to the second positions. More specifically, and referring to FIG. 4, when the wall and door panel members are secured in the closed or first position, the second biasing member 38 is compressed and in contact with the receiver 10 along second portion 46 to help move the door panel 15 apart from the wall panel 14 when the second end 21 of the latching mechanism is operated, or in this case depressed.

A handle member 34 may be provided to facilitate opening and closing the slidable door panel 15. Referring to FIG. 3, the handle 34 may be a U-shaped bar having an integral mounting plate 35. An operator may use the handle to move the door panel 15 into the first or the second position.

Referring to FIG. 3, the latching mechanism 8 may also include a guide bar 32 and guide plate 36, which act in concert to guide the receiver 10 into the latch portion 9. The guide bar 32 extends from the side walls 20a and 20b of the mounting member 17 to substantially surround the first end 19 of the latching member 18. The guide bar 32 may be secured to the side walls 20a and 20b of mounting member 17 using any method such as by welding and is made of a rigid and sturdy construction material such as, but not limited to, steel. In further embodiments, the guide bar is made of powder coated steel. The guide bar also acts to protect the latch member and to provide safety to the user.

The guide plate 36 may be of an angled construction having a first portion 48 and a second portion 50 which is securable to at least two sides of the panel member. In one embodiment, the guide plate 36 is secured to the forward end of the second or stationary member 22 wherein the first portion 48 of the plate is substantially underneath the latching member 18 and either adjacent to or overlapping with the metal support member 22. The second portion 50 of the plate 36 covers the forward end of the panel member. The guide plate may be constructed of a rigid and sturdy construction material such as, but not limited to, steel, e.g., powder coated 3/16" steel.

While not limited thereto, the guide bar 32 and guide plate 36 are particularly advantageous when using a thinner construction door panels and frame. More specifically, these two elements facilitate guiding the latch projection 26 into the slot 12 wherein the latching member 18 will reliably interlock with the receiver 10.

Since the construction of sliding doors varies, an optional element to the instant invention includes one or more spacer elements 42 to facilitate alignment of the latching member 18 and the receiver 10 on the two panels 14, 15. As illustrated in FIG. 3, the spacer element 42 may include a flat plate adapted to be secured between the guide plate 36 and the panel member 14. The spacer element 42 may be made of any material commonly known in the art for such purposes such as, but not limited to, wood, metal, plastic, or the like. The size of the spacer element 42 may be dependent upon the door size and style. To this end, the spacer element may be of any size or style necessary to adjust the distance between the panel member and the latching member and to assist the latching mechanism in adequately securing the latch member to the receiver. The instant invention, however, is not limited to a spacer element being positioned between the guide plate 36 and the panel. In alternative embodiments, although not illustrated, the spacer element may also be position between the metal support member 22 and the panel. Again, the size and material of the spacer element may be dependent upon the door size and style.

In operation, the door panel 15 containing the receiver element 10 is brought into juxtaposition with the panel member 14 containing the latch mechanism 9. As the latch projection 26 slides over the receiver 10, the guide bar 32 and guide plate 36 appropriately guide the receiver and the action of the first biasing member 24 urges the latch projection into the slot 12. This latches the panel members 14, 15 into the first position, which in the case of a stall, closes the opening.

To unlatch and move the wall and door panels 14, 15 into the second or open position, the operator depresses the second end 21 of the latch member 18 against the biasing force of the spring, thus, raising the latch projection 26 from the slot 12. The operator is then able to move the door 15, with the assistance of the spring 38, from the closed first position to the open second position. In embodiments containing the handle 34, the operator may use the handle to facilitate such movement.

While the embodiments provided above illustrate the latch portion 9 being mounted to the stationary panel 14 and the receiver being mounted on the sliding door 15, one of ordinary skill in the art will appreciate that these elements may be reversed, where desired. In other words, the latch portion 9 may be installed on the door, and the receiver is installed on the frame although structural modification of the embodiment as illustrated herein may be required.

One of skill in the art will further appreciate that the instant invention is not limited to sliding doors and may be provided as a latch mechanism for any opening having panel members that are relatively moveable between a first position wherein the panels are adjacent and a second position wherein the panels are separated.

I claim:

1. A latch mechanism for securing a fixed panel member to a movable panel member, one of the panel members being moveable relative to the other panel member between a first position where the panel members are secured to each other and a second position where the panels are separated, the latch mechanism comprising:
    a mounting member mountable to a first of the panel members;
    a latch member pivotally mounted to said mounting member for pivotal movement about a pivot point, said latch member further having a first side positioned to be on one side of the pivot point;
    a latch tooth projecting from said first side of the latch member;
    a receiver mountable to a second of the panel members and having a slot configured and positioned to receive said latch tooth and secure the panel members together in the first position,
    a first biasing member positioned and configured to provide a biasing force on said latching member so as to urge said latch tooth into said slot when the panel members are brought into the first position and, when said latch member is operated so as to move against said biasing force, said latch tooth is released from said slot to allow movement of the panel members to the second position, and
    a second biasing member attached to said mounting member and configured to engage and urge said second panel member away from said first panel member when said panel members are moved toward the second position.

2. The latch mechanism of claim 1 wherein said latch member further comprises a second side positioned on a side of the pivot point opposite from said first side, said second side forming a handle capable of being operated to release said tooth from said slot.

3. The latch mechanism of claim 1 wherein said second biasing member comprises a coil spring.

4. The latch mechanism of claim 1 further comprising a spacer element provided between said mounting member and said first of the panel members to facilitate guiding said latch tooth into alignment with said slot.

5. The latch mechanism of claim 1 wherein said mounting member further comprises a mounting plate and at least two wall plates extending perpendicularly form said mounting plate, and wherein said latch member is pivotally supported between said two wall plates.

6. The latch mechanism of claim 5 wherein latch member pivots about pin attached to and extending between said two wall plates.

7. The latch mechanism of claim 1 wherein said slot comprises an opening.

8. The latch mechanism of claim 1 wherein said first biasing member comprises a coil spring.

9. The latch mechanism of claim 1 wherein said latch tooth has an inclined front surface portion and a vertically oriented rear portion.

10. The latch mechanism of claim 1 wherein each of said latch member, mounting member and receiver are made with 3/16" powder coated steel.

11. A latch mechanism for securing a fixed panel member to a movable panel member, one of the panel members being moveable relative to the other panel member between a first position where the panel members are secured to each other and a second position where the panels are separated, the latch mechanism comprising:
    a mounting member mountable to a first of the panel members;
    a latch member pivotally mounted to said mounting member for pivotal movement about a pivot point, said latch member further having a first side positioned to be on one side of the pivot point;
    a latch tooth projecting from said first side of the latch member;
    a receiver mountable to a second of the panel members and having a slot configured and positioned to receive said latch tooth and secure the panel members together in the first position,
    a biasing member positioned and configured to provide a biasing force on said latching member so as to urge said latch tooth into said slot when the panel members are brought into the first position and, when said latch member is operated so as to move against said biasing force, said latch tooth is released from said slot to allow movement of the panel members to the second position, and
    a guide bar extending from said mounting member and positioned to substantially surround said first side of said latch member wherein said guide bar protects said latch member.

12. The latch mechanism of claim 11 further comprising a guide plate coupled to a leading edge of said first of the panel members wherein said guide plate facilitates guiding said latch tooth into alignment with said slot.

13. The latch mechanism of claim 12 further comprising a spacer element provided between said guide plate and said first of the panel members to facilitate guiding said latch tooth into alignment with said slot.

14. A latch mechanism for securing a fixed panel member to a movable panel member, one of the panel members being moveable relative to the other panel between a first position where the panels are secured to each other and a second position wherein the panels are separated, the latch mechanism comprising:

a mounting member mountable to a first of the panel members;

a latch member pivotally mounted to said mounting member for pivotal movement about a pivot point, and having a first side positioned to be on one side of the pivot point and a second side positioned to be on an opposing side of the pivot point;

a latch tooth projecting from said first side of the latch member;

a receiver mountable to a second of the panel members and providing a slot configured and positionable to receive said latch tooth and secure the panel members together in the first position, a first biasing member positioned and configured to provide a biasing force on the latching member so as to urge said latch tooth into the slot when the panel members are brought into the first position and, when said second side of the latch member is operated against said biasing force, said latch tooth is retracted from said slot to allow movement of the panel members to the second position;

a second biasing member extending from the mounting member in a direction parallel to and substantially underneath said latching member providing opposing forces on both panel members when the panel members are secured in the first position and urging the panel members into the second position when the latch tooth is retracted from the slot.

15. A latch mechanism for securing a barn or stall door to a wall, the door being slidably moveable relative to the wall between a first position where the door and wall are secured to each other and a second position wherein the door and wall are separated, the latch mechanism comprising:

a mounting member mountable to the wall;

a latch member pivotally attached to the mounting member for pivotal movement about a pivot point, and having a first side positioned to be on one side of the pivot point and a second side positioned to be on an opposing side of the pivot point;

a latch tooth projecting from the first side of the latch member;

a receiver mountable to the barn or stall door and providing a slot configured and positioned to receive said latch tooth and secure the door and wall together in the first position;

a biasing member positioned and configured to provide a biasing force on said latching member so as to urge said latch tooth into said slot when the door and wall are secured in the first position and, when the second side of the latch member is operated against the biasing force, the latch tooth is retracted from the slot to allow movement of the door away from the wall and into the second position, a guide bar projecting from the mounting member and positioned to substantially surround the first side of the latch member; and a guide plate mountable to the wall spaced from said guide bar such that said receiver in combination with said door can fit therebetween wherein said guide bar and said guide plate facilitate guiding said latch tooth into alignment with said slot.

16. The latch mechanism of claim 15 further comprising a second biasing member extending from the mounting member in a direction parallel to and substantially underneath the latching member providing opposing forces on both the door and the wall when secured in the first position and urging the door away from the wall and into the second position when the latch tooth is refracted from the slot.

* * * * *